(12) United States Patent
Plichta et al.

(10) Patent No.: US 6,172,892 B1
(45) Date of Patent: Jan. 9, 2001

(54) METHOD FOR USING BATTERY CHARGER ADAPTER FOR MILITARY VEHICLES

(75) Inventors: Edward J. Plichta, Howell; Ronald Thompson, Matawan, both of NJ (US)

(73) Assignee: The United States of America as represented by the Secretary of the Army, Washington, DC (US)

(*) Notice: Under 35 U.S.C. 154(b), the term of this patent shall be extended for 0 days.

(21) Appl. No.: 09/558,794

(22) Filed: Apr. 25, 2000

Related U.S. Application Data

(62) Division of application No. 09/246,201, filed on Jan. 7, 1999, now Pat. No. 6,115,277.

(51) Int. Cl.$^7$ .................................................. H02M 1/00
(52) U.S. Cl. ................................... 363/146; 320/136
(58) Field of Search ........................... 363/146; 320/119, 320/122, 136

(56) References Cited

U.S. PATENT DOCUMENTS

| 5,281,904 | * | 1/1994 | Tomkins | 320/2 |
| 5,504,413 | * | 4/1996 | Fernandez et al. | 320/12 |
| 5,850,136 | * | 12/1998 | Kaneko | 320/119 |
| 6,115,277 | * | 9/2000 | Plichta et al. | 363/146 |

* cited by examiner

Primary Examiner—Adolf Daneke Berhane
(74) Attorney, Agent, or Firm—Michael Zelenka; George B. Tereschuk

(57) ABSTRACT

Military vehicles often provide power to operate chargers to charge portable rechargeable batteries in the field. The military uses a NATO standardized DC slave plug as a connection from the vehicle battery to external charger devices. The NATO standardized DC slave plug is directly connected to the vehicle battery and offers no electrical protection to the vehicle battery. This method employs a battery charger adapter providing controlled DC power from the vehicle battery to charger devices for recharging Army communication batteries. The battery charger adapter is connected between the NATO standardized DC slave plug and an external charger and includes an electromechanical relay acting as an automatic safety switch which cuts off the load on the vehicle battery when the battery voltage falls to a predetermined critical voltage level, to prevent overdischarge of the vehicle battery.

The critical voltage level may be generally determined by the amount of charge necessary in the vehicle battery to start or reliably operate the vehicle. Through this method, the chargers for Army portable rechargeable batteries can be operated using military vehicle power while ensuring that the vehicle battery retains sufficient reserve power to start the vehicle's engine.

16 Claims, 3 Drawing Sheets

METHOD FOR USING BATTERY CHARGER ADAPTER FOR MILITARY VEHICLES

DIVISIONAL APPLICATION

This application is a divisional application of U.S. patent application Ser. No. 09/246,201, now U.S. Pat. No. 6,115,277, entitled "Battery Charger Adapter for Military Vehicles," designated as and filed on Jan. 7, 1999 by the inventors herein. This divisional application is being filed under 35 USC § 120 and 37 CFR § 1.53, and priority from that application is hereby claimed.

GOVERNMENT INTEREST

The invention described herein may be manufactured, used, and licensed by or for the Government for governmental purposes without the payment to us of any royalty thereon.

FIELD OF THE INVENTION

The present invention relates in general to electrical connectors. In particular, the invention is directed to a DC connector adapter which provides a multi-plug DC electrical connection for powering chargers used to charge rechargeable batteries through a military vehicle NATO slave connector while preventing the over-discharge of the vehicle battery when a load is applied through the connector.

BACKGROUND OF THE INVENTION

Presently, the Army requires that military vehicles be used to provide power to charging devices which in turn are used to charge Army portable rechargeable batteries. Under current practices, a NATO standardized DC slave plug connector is directly connected to vehicle battery to transfer charge from the vehicle to the charging device.

The problem with drawing power from the vehicle in this manner is that the NATO slave connector is unregulated. As such, the charging devices will continue to draw charge from the vehicle or host battery until the charging devices are fully charged or the host battery is drained of its own charge. Since a threshold amount of charge in the vehicle battery is necessary to operate the vehicle, the unregulated transfer of charge from the vehicle battery to the charger devices may potentially leave the vehicle battery with a charge level below that necessary to operate the vehicle. This situation is often encountered in the Army in charging up the charging devices used to charge the rechargeable batteries for the portable communication equipment of Army personnel, where the charge transferring process is set up and performed while the Army personnel are engaged in duties remote from the charging site.

Although the problem discussed above may be avoided by physically disconnecting the connector from the vehicle battery before the amount of charge drained from the battery reaches a critical level, this solution requires the sacrifice of manpower from other duties in order to keep vigil during the charging process. Such a solution, therefore, is generally impractical. Hence, it is desirable to find an alternative means for preventing the over-discharge of the vehicle battery which does not rely upon human intervention, while providing power to the charging devices in accordance with Army guidelines.

SUMMARY OF THE INVENTION

In addressing the need identified above, it is thus an aspect of the present invention to provide a DC connector adapter for use in providing controlled DC power from a military vehicle to charger devices for recharging communication batteries.

It is an additional aspect of the present invention to provide a DC connector adaptor for use in providing DC power from a military vehicle to charger devices for recharging communication batteries, having a switching means to prevent the over-discharge of a vehicle power source.

It is a further aspect of the present invention to provide a DC connector adaptor for use in providing DC power from a military vehicle to charger devices for recharging communication batteries, which automatically stops the transfer of power when the available charge level of the vehicle power source falls to a predetermined level.

The present invention provides a DC connector adapter which includes a slave connector on one side thereof and a plurality of output connectors on the other side thereof. The slave connector allows for the connection of the adapter to a power source such as a vehicle battery. The output connectors allow for the connection of a corresponding number of charger devices for recharging rechargeable batteries. The adapter further includes an automatic switch which terminates a load on the power source to which the slave connector is connected when a voltage supplied by the power source falls to a critical level.

Other features and advantages of the present invention will become apparent from the following description of the invention which refers to the accompanying drawings.

DETAILED DESCRIPTION OF THE PREFERRED EMBODIMENT

Figure 1:
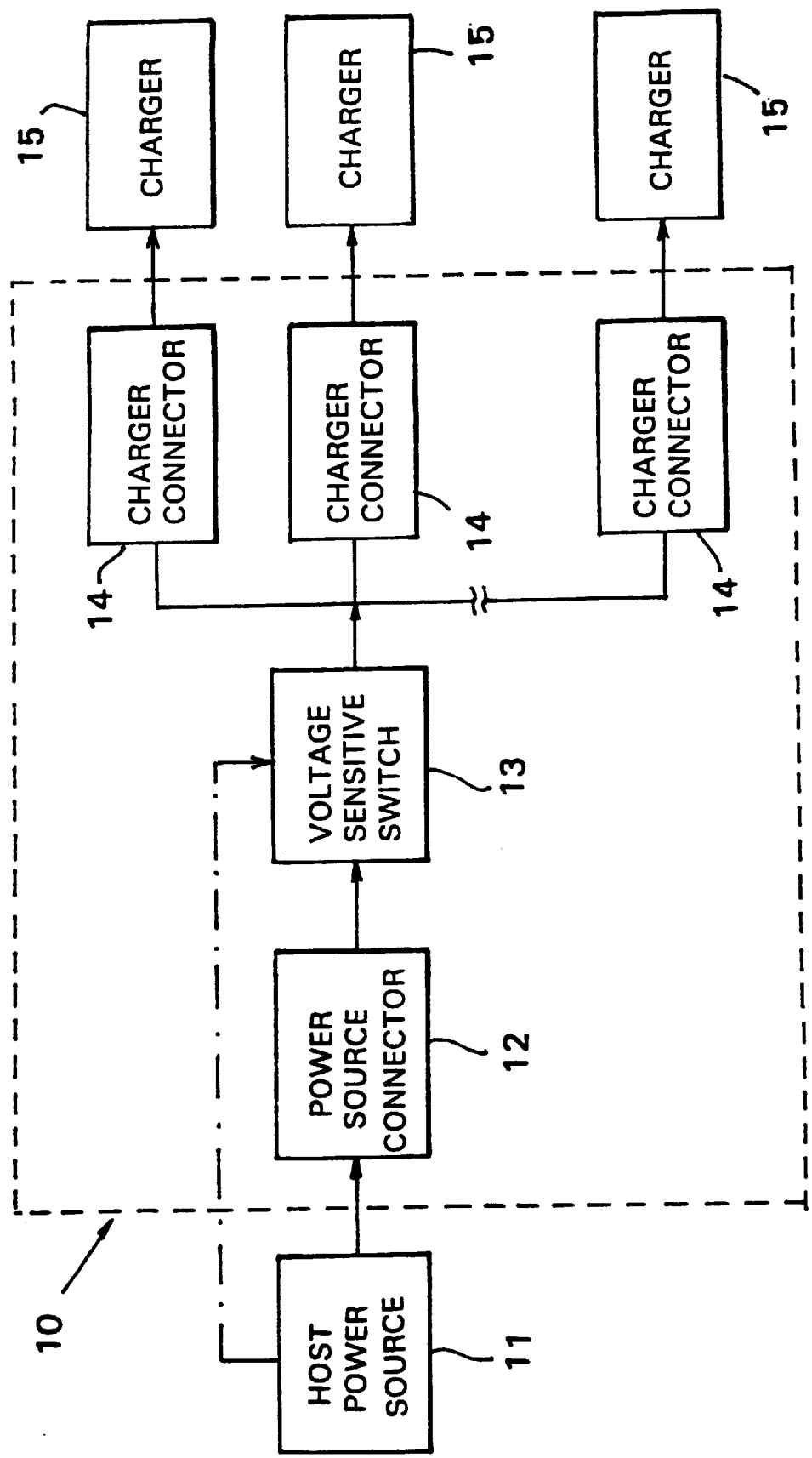
FIG. 1 is a block diagram of a connector adapter according to the present invention.

FIG. 1 is an overall diagram of the connector adapter 10 of the present invention when connected to a host battery 11 and charging devices 15 during operation. The elements of adapter 10 are shown inside the dashed box and include a power source connector 12 for connecting to the host power source 11, a plurality of output connectors 14 for connecting to the devices 15 receiving the charge from power source 11, and a voltage sensitive switch 13 (an undervoltage drop-out device) for opening the connection between connector 12 and output connectors 14 when the voltage of the host battery falls below a predetermined threshold level. To determine the voltage of the host battery 11, the voltage sensitive switch 13 detects the voltage level of the host power source 11 through the connection indicated by the broken line between these two elements as shown in FIG. 1.

In the embodiment shown in FIG. 1, the devices 15 being charged are charging devices and output connectors 14 are charger connectors. The switching circuit may be an electromechanical relay, a transistorized switch such as a power MOSFET, or any other type of automatic switching means known in the art which operates in the manner described herein.

Figure 3:
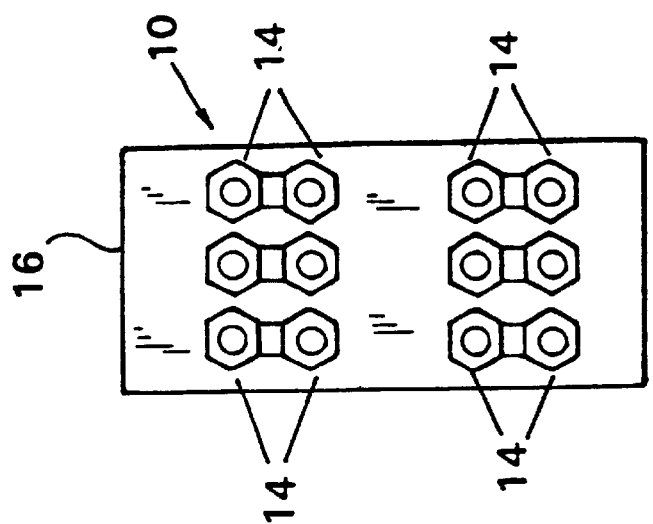
FIG. 3 is a rear view of the connector adapter shown in FIG. 2.
Figure 4:
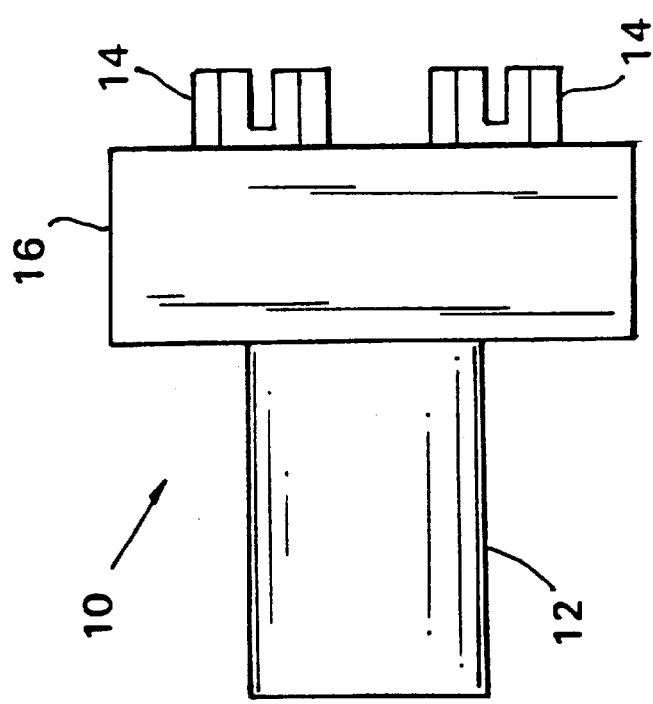
FIG. 4 is a side view of the connector adapter shown in FIG. 2.
Figure 2:
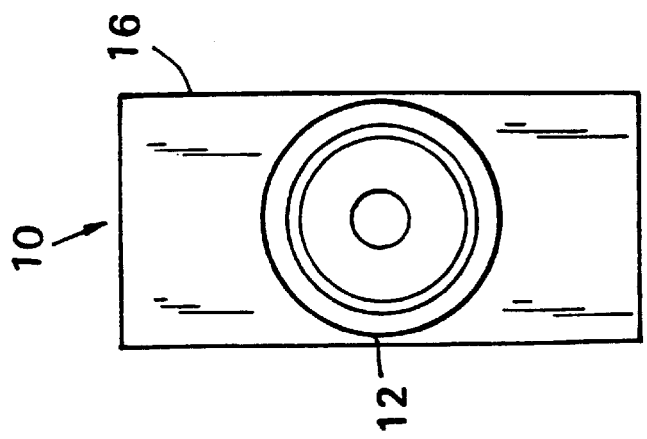
FIG. 2 is a front view of a preferred embodiment of a connector adapter according to the present invention.

FIGS. 2–4 illustrate a physical embodiment of a DC connector adapter 10 according to a preferred embodiment of the present invention for use in providing controlled DC power from a military vehicle battery as the host power source to a plurality of charger devices used for the charging of communication batteries. Similar or identical parts in the various drawings have been identified with similar reference numerals.

Adapter 10 includes a coaxial slave connector 12 on one side, which is suitably adapted to be connected to the positive and negative terminals of the vehicle battery 11 of FIG. 1 serving as the power source. Alternatively, other types of connectors may be substituted for coaxial slave connector 12. The other side of adapter 10 includes a plurality of output connectors 14 to allow the multiple charging devices 15 of FIG. 1 to be coupled to vehicle battery 11 through power source connector 12. In the preferred embodiment illustrated in FIGS. 3 and 6, six pairs of negative and positive terminals are connected in parallel and are arranged in two rows. Although shown as such, it is consistent within the scope of the present invention that power source connector 12 and output connectors 14 may be placed in a variety of configurations relative to one another other than on opposite sides of adapter 10. Similarly, more or less output connectors may be provided and in various configurations in accordance with the present invention.

As shown in FIGS. 2–4, power source connector 12, voltage sensitive switch 13, and output connectors 14 are shown encased in housing 16, which is preferably made of plastic. Alternatively, however, housing 16 may be omitted, in which case power source connector 12, voltage sensitive switch 13, and output connectors 14 may be connected using simple conductive cables (not shown).

When host battery 11 is sufficiently charged such that the amount of charge available in the host battery is above a predetermined threshold level, charge from the battery can be safely transferred through connector adapter 10 of the present invention to the charging devices connected to the output connectors 14 of connector adapter 10. On the other hand, when the charge level of the host battery 11 is at or below the threshold level, switching circuit 13 within connector adapter 10 of the present invention causes the circuit between power source connector 12 and output connectors 14 to open and interrupt the transfer of charge from the host battery to the charging devices coupled to output connectors 3. The predetermined threshold level may be determined by a desired charge condition or minimum voltage of the host battery 11. In the application discussed in connection with the present invention, for example, the predetermined charge level is determined to be the minimum charge level of the battery necessary to start the military vehicle providing the host battery 11. By causing the switching circuit to interrupt the transfer of charge prior to the charge level in the host battery being reduced below the predetermined level, it is possible to preserve enough power in the vehicle battery to ensure the operational capability of the host vehicle.

Figure 5:
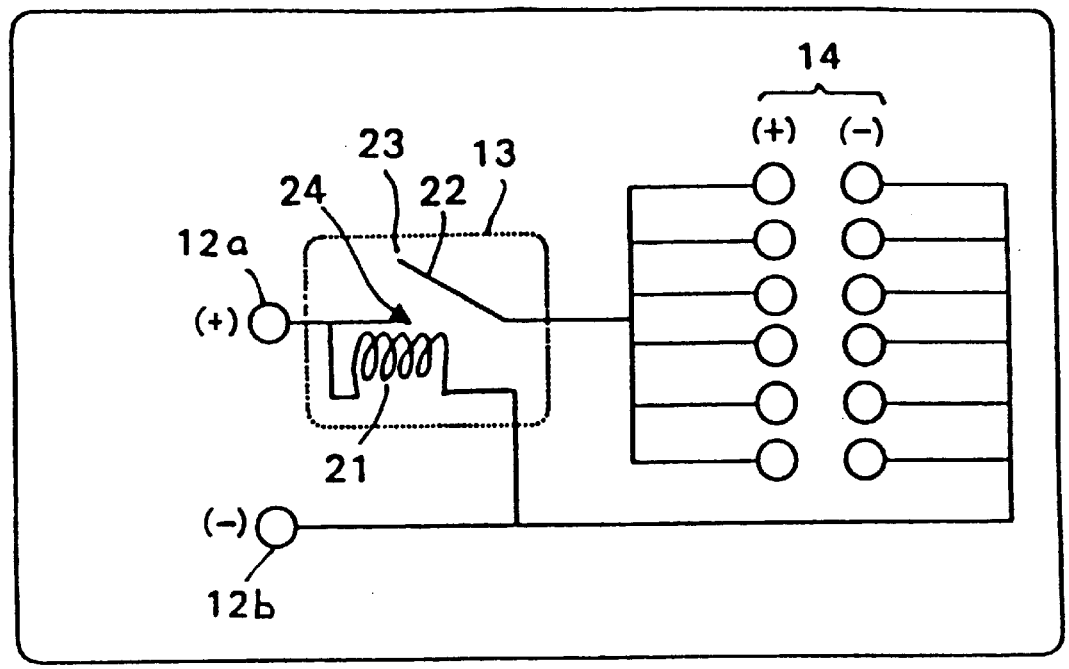
FIG. 5 is a schematic view of a first embodiment of the operational elements in the adapter shown in FIG. 1.
Figure 6:
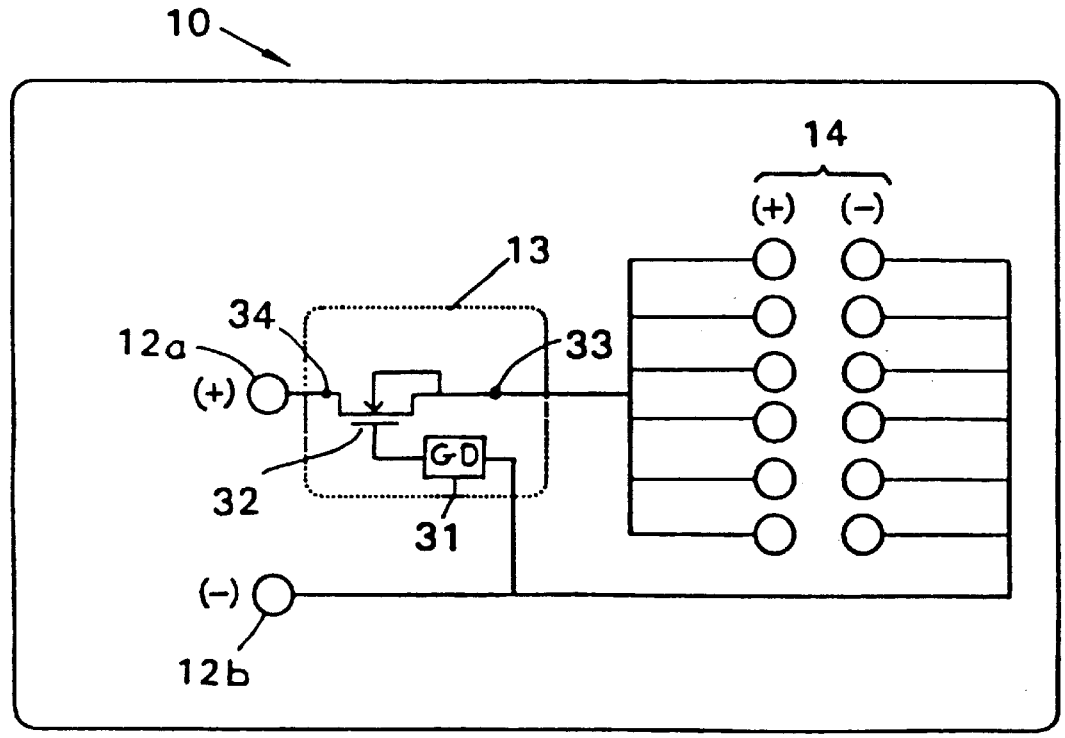
FIG. 6 is a schematic view of a second embodiment of the operational elements in the adapter shown in FIG. 1.

Example embodiments of switching circuit 13 are schematically illustrated in FIGS. 5 and 6. Referring first to the embodiment shown in FIG. 5, switching circuit 13 is shown as a conventional electromechanical relay switch having a coil 21 and a contact arm 22 operated by a suitable armature, not shown. The relay switch has generally an "open" or "off" state which is the default position of the mechanism, and a "closed" or "on" state. In the "closed" state, contact arm 22 moves so that movable contact 23 contacts fixed contact 24, thus permitting charge to be transferred from input connector 12 to output connectors 14. In the "open" state, contact arm 22 is positioned so that movable contact 23 of armature 22 is separated from fixed contact 24. Thus, the transfer of charge from input connector 12 to output connectors 14 is interrupted.

Relay coil 21 is connected directly across terminals 12a and 12b of host battery 11 so that the magnetic field generated in relay coil 21 directly reflects the voltage of the battery. As power is transferred to charging devices 15 through connector 10, The battery discharges and causes the voltage between the terminals 12a and 12b to decrease. Relay switch 13 is adjusted to trip open when the voltage between terminals 12a and 12b drops to the minimum level which is still high enough to start the vehicle associated with host battery 11.

Referring now to the example embodiment shown in FIG. 6, switching circuit 13 is shown as a transistorized switch, and more particularly as a power MOSFET. Power MOSFET 13 is connected across battery terminals 12a and 12b and has a source 33, a drain 34, and a gate 32, and a gate driver 31 to drive gate 32. Since the gate voltage is directly proportional to the amount of charge to in the battery, gate driver 31 turns "on" the power MOSFET 13 when the battery voltage between terminals 12a and 12b is above the predetermined threshold level. Conversely, when the voltage between the terminals 12a and 12b falls below the preset threshold level, gate driver 31 turns "off" the power MOSFET 13 so that current flow therethrough is discontinued so as to prevent further charging of charging devices 15 connected to output connectors 14 from host battery connected to connector 12.

In a preferred use environment of the present invention, the DC connector adapter is used as a NATO slave DC connector adapter which is coupled to a battery of a military vehicle. A plurality, i.e., six as shown in FIGS. 3 and 6, of charging devices used to charge rechargeable batteries used in portable communication equipment used by Army personnel are then connected to the power source connector in the connector adapter so that charge can be drawn from the vehicle battery to provide power to the charging devices. The typical minimum battery voltage needed to start a military vehicle is about 22 VDC on a 24 VDC battery. Thus, the switching circuit 13 of FIGS. 5 or 6 in the NATO slave connector (in accordance with the present invention) is set to open at 22 VDC and close when the vehicle battery voltage rises above 22 VDC. When the switch is closed, the vehicle battery is permitted to discharge in order to provide power to the devices connected to the output connectors of the connector adapter.

Other types of use environments are consistent with the present invention which require the powering of one device from the power of a host device. Additionally, many types of automatic switching circuits are known in the art. Accordingly, any of such types may be used as the switching means of the present invention, without being limited to the specific embodiments discussed above.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of preventing discharge of a power source below a predetermined amount when transferring electrical power from said power source to a receiving device, comprising the steps of:

connecting an input terminal of a variable DC connector adapter to the power source, said input terminal being a coaxial slave connector;

connecting an output terminal of the variable DC connector adapter to at least one receiving device to receive the transferred charge;

transferring charge from the power source to the at least one receiving device through the variable DC connector adapter; and automatically interrupting the transfer of charge with a means for electromechanical relay when a remaining charge level in the power source falls below a predetermined level to avoid over-discharging the power source.

2. The method according to claim 1, wherein the power source is a vehicle battery and the predetermined level is a level of charge necessary in the vehicle battery to start a host vehicle associated with the vehicle battery.

3. The method according to claim 1, wherein the at least one receiving device is a charging device used to charge rechargeable batteries.

4. The method according to claim 1, wherein the at least one receiving device being connected to the power source is a plurality of devices.

5. The method according to claim 1, wherein the electromechanical relay means is an electromechanical relay.

6. The method according to claim 1, wherein the electromechanical relay means is a transistorized switch.

7. The method according to claim 6, wherein the transistorized switch is a power MOSFET.

8. The method according to claim 1, further comprising the step of connecting the electromechanical relay means in series between the input connector and each of a plurality of output connectors.

9. The method according to claim 8, further comprising the step of connecting the plurality of output connectors in parallel.

10. The method according to claim 9, further comprising the step of forming the connector adapter to have an exterior surface configuration of a NATO-type DC connector adapter.

11. The method according to claim 1, further comprising the step of:

forming a housing having a first side and a second side, wherein the input connector is disposed on the first side and the at least one output connector is disposed on the second side; and the electromechanical relay means is disposed within the housing.

12. The method according to claim 11, further comprising the step of forming the first side and the second side on opposite sides of the housing.

13. The method according to claim 11, further comprising the step of forming the housing from plastic.

14. The method according to claim 13, wherein the predetermined voltage is an input voltage level of 22 VDC.

15. The method according to claim 2, further comprising, in combination with said host vehicle battery, the step of adapting the input connector for connection to the positive and negative terminals of the vehicle battery.

16. The method according to claim 15, further comprising, in combination with the at least one charging device, the step of adapting each of the receiving devices for connection to a corresponding charging device.

* * * * *